United States Patent [19]

Goetz et al.

[11] Patent Number: 5,217,928
[45] Date of Patent: Jun. 8, 1993

[54] HOLLOW GLASS SPHERES

[75] Inventors: Kenneth E. Goetz, Maplewood, N.J.; James A. Hagarman, Audubon, Pa.; Joseph P. Giovene, Jr., Belleville, N.J.

[73] Assignee: Potters Industries, Inc., Parsippany, N.J.

[21] Appl. No.: 637,619

[22] Filed: Jan. 4, 1991

Related U.S. Application Data

[63] Continuation of Ser. No. 236,042, Aug. 24, 1988, Pat. No. 4,983,550.

[51] Int. Cl.$^5$ ............................................. C03C 12/00
[52] U.S. Cl. ......................................... 501/33; 501/39; 501/57; 501/58; 501/59; 501/63; 501/67; 501/68; 501/69; 501/70; 501/72; 524/494
[58] Field of Search ............... 501/33, 39, 57, 58, 501/59, 63, 65, 67, 68, 69, 70, 72; 524/494

[56] References Cited

U.S. PATENT DOCUMENTS

| | | | |
|---|---|---|---|
| 3,365,315 | 1/1968 | Beck et al. | 501/33 |
| 3,429,721 | 2/1969 | Sprout . | |
| 3,519,446 | 7/1970 | Earl | 501/16 |
| 4,391,646 | 7/1983 | Howell | 501/33 |
| 4,661,137 | 4/1987 | Garnier et al. | 428/312.6 |
| 4,677,022 | 6/1987 | Dejaiffa | 501/33 |
| 4,767,726 | 8/1988 | Marhshall | 501/33 |
| 4,904,293 | 2/1990 | Garnier et al. | 65/21.4 |
| 4,983,550 | 1/1991 | Goetz et al. | 501/33 |
| 5,064,784 | 11/1991 | Saito et al. | 501/33 |

FOREIGN PATENT DOCUMENTS

| | | |
|---|---|---|
| 276921 | 8/1988 | European Pat. Off. . |
| 0393625 | 10/1990 | European Pat. Off. . |
| 5937565 | 10/1974 | Japan . |
| 1451105 | 1/1989 | U.S.S.R. . |

OTHER PUBLICATIONS

Volf, *Chemical Approach to Glass*, (7), pp. 219–221, 418–421, 408–418, 1985.
Budov, et al., USSR Counsel of Ministers' Committee for Inventions No. 1451105, published Jan. 15, 1989.
Chemical Abstracts 107: 119955H (1987).
*Glass and Ceramics*, vol. 45. No. 8, Aug., 1988, pp. 289–291.
Chemical Abstracts 88: 196379Q (1978).
Chemical Abstracts 109: 10650V (1988).

*Primary Examiner*—David Brunsman
*Attorney, Agent, or Firm*—Curtis, Morris & Safford

[57] ABSTRACT

Hollow glass spheres having average densities of approximately 0.10 grams/cc to approximately 2.0 grams/cc are prepared by heating solid glass particles. The glass spheres consist essentially of the following ingredients in the following amounts stated as weight percentages: $SiO_2$(50 to 57%); $R_2O$(2 to 15%); $B_2O_3$(0 to 20%); S(0.05 to 1.5%); RO(2 to 25%); $RO_2$(other than $SiO_2$) (0 to 5%); $R_2O_3$(other than $B_2O_3$) (0 to 10%); $R_2O_5$(0 to 5%); and F(0 to 5%). R represents a metal or an element like phosphorous which combines with oxygen in glass. The sizes of the hollow glass spheres are selected to produce a maximum average strength for a desired average density.

35 Claims, No Drawings

HOLLOW GLASS SPHERES

This application is a continuation of application Ser. No. 236,042 filed Aug. 24, 1988 now U.S. Pat. No. 4,983,550.

FIELD OF THE INVENTION

This invention relates to hollow glass spheres made by heating solid glass particles.

BACKGROUND OF THE INVENTION

Hollow glass spheres are widely used in industry as additives to polymeric compounds, e.g., as modifiers, enhancers, rigidifiers and fillers. Generally, it is desirable that these spheres be strong to avoid being crushed or broken during further processing of the polymeric compound, such as by high pressure spraying, kneading, extrusion or injection molding. It also is desirable in many cases that these spheres have densities close to that of the polymeric compound into which they are introduced in order that they distribute evenly within the compound upon introduction and mixing. Furthermore, it is desirable that these spheres be resistant to leaching or other chemical interaction with their associated polymeric- compound.

The method of expanding solid glass particles into hollow glass spheres by heating is well known. See, e.g., U.S. Pat. No. 3,365,315. Glass is ground to particulate form and then heated to cause the particles to become plastic and for gaseous material within the glass to act as a blowing agent to cause the particles to expand. During heating and expansion, the particles are maintained in a suspended state either by directing gas currents under them or allowing them to fall freely through a heating zone. Sulfur, or compounds of oxygen and sulfur, serves as the principal blowing agent.

A number of factors affect the density, size, strength, chemical durability and yield (the percentage by weight or volume of heated particles that become hollow) of hollow glass spheres. These factors include the chemical composition of the glass; the sizes of the particles fed into the furnace; the temperature and duration of heating the particles; and the chemical atmosphere (e.g., oxidizing or reducing) to which the particles are exposed during heating.

There have been problems in attempting to improve the quality and yield of hollow glass spheres. One reason is that it was believed that the percentage of silica ($SiO_2$) in glass used to form hollow glass spheres should be between 65 and 85 percent by weight and that a weight percentage of $SiO_2$ below 60 to 65 percent would drastically reduce the yield of the hollow spheres. Also, the prior art has overlooked the significant improvement in strength of hollow glass spheres achieved through the optimization of particle size.

OBJECTS AND SUMMARY OF THE INVENTION

Accordingly, it is an object of the present invention to provide an improved yield of hollow glass spheres from glass particles.

Another object of the invention is to provide hollow glass spheres which permit the use of a wider range of materials. Particularly, the invention has the object of providing improved hollow glass spheres having a content of silica between 50 and 57 percent.

It is a further object of this invention to provide hollow glass spheres which exhibit high strength and resistance to crushing or breaking. Also, the invention has the object of providing hollow glass spheres highly resistant to chemical decomposition or leaching.

It is yet another object of the invention to provide hollow glass spheres of selected average density having a range of sizes which provide optimum average strength.

It is still a further object of this invention to provide hollow glass spheres having average densities ranging from 0.10 grams per cubic centimeter to 2.0 grams per cubic centimeter. Also, the invention has the object of providing hollow glass spheres having average densities generally matching the polymeric compounds into which they are introduced.

It is still another object of the invention to provide polymeric composites containing hollow glass spheres as aforesaid.

These objects are met by the present invention.

The present invention provides hollow glass spheres which exhibit greater average strength and resistance to crushing or breaking than commercial glass spheres of comparable average density. These glass spheres also are highly resistant to chemical decomposition or leaching which enables them to be used with a wide range of polymeric compounds. The yield of hollow glass spheres of the present invention also is very high.

The high strength, chemical resistivity and yield of the hollow glass spheres of the present invention is the result of a new composition of glass. The strength of these spheres also is the result of optimally selecting the range of sizes of particles comprising the final product. We have found that for a product of hollow glass spheres of a particular desired average density, there is an optimum range of sizes of particles making up that product which produces the maximum average strength.

The hollow glass spheres of the present invention can be produced with average densities ranging from approximately 0.10 grams per cubic centimeter to approximately 2.0 grams per cubic centimeter (solid glass has an average density of approximately 2.5 grams per cubic centimeter) In several advantageous embodiments, these spheres comprise glass that contains the following ingredients (that may be present within the glass itself or the hollow cavity within the glass sphere) in the following amounts stated as weight percentages. (R represents a metal or an element like phosphorous which combines with oxygen in glass.)

| | |
|---|---|
| $SiO_2$ | 50–57 |
| $R_2O$ (alkali metal oxides) | 2–15 |
| $B_2O_3$ | 0–20 |
| S | .05–1.5 |
| RO | 2–25 |
| $RO_2$ (other than $SiO_2$) | 0–5 |
| $R_2O_3$ (other than $B_2O_3$) | 0–10 |
| $R_2O_5$ | 0–5 |
| F | 0–5 |

Preferably, the glass has a substantially molar balance of several alkali metal oxides, such as $Li_2O$, $Na_2O$ and $K_2O$, which has been found to improve chemical durability and resistance to leaching.

Glass particles of the present invention are heated to cause them to expand into hollow spheres. The heat may be applied using conventional methods such as a furnace. The furnace preferably provides a quantity of excess gas of between approximately 5 and 25 percent above a stoichiometric mixture of gas and air to provide a reducing atmosphere for the particles during heating.

The hollow glass spheres of the present invention can be used in a wide range of polymeric compounds, such as paints, coatings, plastisols, organasols, thermoplastic and thermosetting polymers, rigidifiers and spackling compounds. Because of their high strength and durability, there spheres can be incorporated into a wide range of polymers and subjected to the high pressures of extrusion and injection molding.

The present invention, including further objects, features and advantages, will be more fully understood from the following detailed description.

DESCRIPTION OF CERTAIN PREFERRED EMBODIMENTS

A central feature of the present invention is a new composition of glass used to produce hollow glass spheres. The principal ingredient in this glass is $SiO_2$ which is present in an amount between 50 and 57 weight percent.

An alkali metal oxide ($R_2O$) is included in the glass in an amount equal to between 2 and 15 weight percent. Preferably, $R_2O$ comprises $Na_2O$, $K_2O$ and $Li_2O$ in weight percentages preferably ranging from 2.5 to 12.8, 3.8 to 10.0 and 1.0 to 3.0, respectively. Advantageously, each of these alkali metal oxides is included in the glass in a substantially molar balance for improved chemical durability and resistance to leaching. Such a balance is substantially achieved with a glass containing approximately one part by eight $Li_2O$, to two parts by weight $Na_2O$, to three parts by weight $K_2O$.

$B_2O_3$ is present in the glass in a weight percentage of between 0 and 20 to lower melting temperature and improve chemical durability. Preferably, the glass composition contains between 6 and 15 weight percent $B_2O_3$.

A weight percentage of sulfur (as an individual element or in combination with another element such as oxygen as, e.g., $SO_2$ or $SO_3$) of between 0.05 and 1.5 is present in the glass to provide a blowing agent. If the parameters (time, duration and heating atmosphere) of heating the glass particles remain fixed, the density of the hollow glass spheres decreases as both the percentage of sulfur, or compounds of oxygen and sulfur, in the glass and the size of the feedstock particles increase. By controlling average feedstock size and the percentage of sulfur in the glass, the glass spheres of the present invention can be produced with average densities ranging from 0.10 grams per cubic centimeter to 2.0 grams per cubic centimeter.

The glass contains RO in a weight percentage of between 2 and 25. Preferably, these oxides are CaO and ZnO and are present in the glass in weight percentages ranging from 5 to 20 and 1.5 to 4.0, respectively. These oxides improve the chemical durability and resistance to leaching of the glass. CaO, moreover, improves the workability and viscosity of the glass over a wider range of temperatures, and ZnO helps the glass to retain sulfur during its preparation.

$RO_2$ (other than $SiO_2$) can be present in the glass up to 5 weight percent. Preferably, however, it is omitted and is present only as an impurity.

$R_2O_3$ (other than $B_2O_3$ can be present in the glass up to 10 weight percent. Preferably, this oxide is $Al_2O_3$ and is present in a weight percentage of between 2 and 7.

The presence of this oxide improves chemical durability and resistance to leaching.

$R_2O_5$ can be present in the glass up to 5 weight percent. Preferably, this oxide is $P_2O_5$ and is present in an amount ranging from 0.5 to 4 weight percent. A small amount of $P_2O_5$ is believed to reduce the glass' melting point and improve its workability.

Flourine can be present in the glass in an amount up to 5 weight percent. Preferably, flourine is present in a weight percentage ranging from 1.5 to 2.5. Flourine improves the workability and viscosity of the glass over a wider range of temperatures and is believed also to act as an additional blowing agent during glass expansion.

In certain preferred embodiments, the glass is prepared by introducing glass-forming materials into a crucible in amounts which will result in the desired glass composition after heating and cooling. One of ordinary skill in the art could select appropriate amounts of glass-forming materials to prepare glass having the composition of this invention. After heating, the molten materials are quenched in water to produce a glass frit which is ground into the particles used to produce the hollow glass spheres.

The particles are heated and caused to expand in apparatus similar to that described in U.S. Pat. Nos. 2,619,776 and 2,945,326. Preferably, the glass particles are air classified prior to heating using, for example, an Alpine American, Model 132 MP, air classifier, to provide a selected range of sizes of particles for feeding into the furnace to produce an optimum range of sizes of particles in the final glass-sphere product.

For a product of hollow glass spheres having a particular desired average density, there is an optimum range of sizes of particles making up that product which produces the maximum average strength. This range can be expressed by the following formula:

$$\frac{90P - 10P}{50P} = GQ$$

$$.8 \leq GQ \leq 1.3$$

where 90P is the size for which 90% of the particles in the glass-sphere product are smaller (referred to as the 90th percentile size); 10P is the size for which only 10% of the particles in the glass-sphere product are smaller (referred to as the 10th percentile size); 50P is the size for which 50% of the particles in the glass-sphere product are smaller (referred to as the 50th percentile size); and GQ stands for the gradation quotient. We have found that in order to maximize the average strength of a product of hollow glass spheres having a selected average density, the sizes of particles making up that product should have a GQ of between 0.8 and 1.3. We have found that a GQ within this range maximizes the strength of the product independently of its chemical composition.

It should be understood that a product of hollow glass spheres can include both solid and hollow glass spheres. All the particles heated in the furnace do not expand, and most hollow glass-sphere products are sold without separating the hollow from the solid spheres.

The invention will be further understood from the following examples.

EXAMPLE 1

Molten glass was quenched in water to produce a glass frit having a chemical composition calculated as follows (amounts are indicated as weight percentages): 53.81% $SiO_2$; 4.29% $Na_2O$; 6.36% $K_2O$; 2.06% $Li_2O$; 11.74% $B_2O_3$; 1.37% $SO_3$; 10.64% CaO; 1.96% ZnO; 4.89% ; 0.98% $P_2O_5$; and 1.90% $F_2$. The glass was ground to particles and air classified to provide the following breakdown of sizes 90% smaller than 46.5 microns (90P=46.5 microns); 10% smaller than 15.2 microns (10P=15.2 microns); and 50% smaller than 29.1 microns (50P=29.1 microns). These particles were fed into a furnace at the rate of 2.5 pounds per hour using 130 cubic feet per hour of gas at a gas/air mixture which was approximately 12% excess gas (12% above a stoichiometric mixture). The resultant glass-sphere product had an average density of 0.22 grams per cubic centimeter at a yield of 92.6% by weight hollow glass spheres. Average density was determined by weighing a sample of the glass-sphere product and determining its volume with an air comparison pycnometer.

The breakdown of sizes of this glass-sphere product was as follows: 90P=104 microns; 10P=35.8 microns; and 50P=66.1 microns. Accordingly, its gradation quotient (GQ=90P−10P/50P) was 1.03.

The strength of this glass-sphere product was determined by subjecting a sample to hydrostatic pressure and determining the percentage of volume loss. These percentages were as follows for the following hydrostatic pressures: 21.7% at 500 psi; 45.0% at 750 psi; and 58.6% at 1000 psi. By comparison, the strongest commercial glass-sphere product of comparable average density (0.23 grams per cubic centimeter) lost 54% of its volume at 750 psi.

The chemical durability and resistance to leaching of this glass-sphere product was determined by subjecting a sample to boiling deionized water for one hour under reflux and then testing the conductivity, pH, sodium content and potassium content of the water. The results were as follows: conductivity=61 $\mu$mho/cm; ph=8; sodium=4.2 mg/liter; potassium=8.8 mg/liter. By comparison, a commercial glass-sphere product of comparable density subjected to the same test produced the following results: conductivity=200 $\mu$mho/cm; ph=8.8; sodium=21.2 mg/liter; and potassium=11.6 mg/liter.

EXAMPLE 2

A glass frit was prepared with a calculated chemical composition the same as Example 1. This frit was ground to provide a breakdown of particle sizes as follows: 90P=19.8 microns; 10P=3.6 microns; and 50P=11.3 microns. These particles were fed into a furnace at the rate of 3.4 pounds per hour with the furnace being fed gas at the rate of 120 cubic feet per hour at a gas/air mixture which was approximately 9% excess gas. The resultant glass-sphere product had an average density of 0.30 grams per cubic centimeter at a yield of 98.4% by weight hollow spheres. This glass-sphere product was comprised of spheres having the following breakdown of sizes: 90P=44.8 microns; 10P=13.2 microns; and 50P=29.5 microns. Accordingly, its GP was 1.07.

The percentage volume loss of this product under hydrostatic pressure was as follows: 2% at 500 psi; 5% at 750 psi; and 11% at 1000 psi. By comparison, the strongest commercial product of comparable average density (0.28 grams per cubic centimeter) had a percentage volume loss of 10% at 500 psi, 23% at 750 psi, and 35% at 1000 psi.

EXAMPLE 3

Molten glass was quenched in water to produce a glass frit having a chemical composition calculated as follows (amounts are indicated as weight percentages): 54.18% $SiO_2$; 66% $Na_2O$; 3.94% $K_2O$; 1.28% $Li_2O$; 11.82% $B_2O_3$; 0.69% $SO_3$; 5.64% CaO; 1.97% ZnO; 4.93% Al 0.99% $P_2O_5$; and 1.92% $F_2$. The frit was ground to provide particles having a breakdown of sizes as follows: 90P=17.1 microns; 10P=6.0 microns; and 50P=11.3 microns. These particles were fed into a furnace at the rate of 3.7 pounds per hour using gas at the rate of 147 cubic feet per hour at a gas/air mixture which was approximately 22% excess gas. The resultant glass-sphere product had an average density of 0.611 grams per cubic centimeter at a yield of 92.5% by weight hollow spheres. This product was comprised of particles whose sizes broke down as follows: 90P=25.7 microns; 10P=10.0 microns; and 50P=17.7 microns. Accordingly, its GP was 0.89.

A hydrostatic test of this glass-sphere product produced only a 1.7% volume loss at 3000 psi, and only a 25% volume loss at 10,000 psi. By comparison, the strongest commercial product of comparable average density (6 grams per cubic centimeter) had a percentage volume loss of 50% at 10,000 psi.

These same two products also were introduced into polymers subjected to injection molding on the same injection molder. The percentage of spheres breaking during this molding was insignificant for this glass-sphere product, but substantial for the commercial product.

EXAMPLE 4

A glass frit having the same chemical composition as Example 3 was ground to provide a breakdown of particle sizes as follows: 90P=8.3 microns; 10P=1.8 microns; and 50P=4.8 microns. These particles were fed into a furnace at the rate of 3.4 pounds per hour using gas at the rate of 115 cubic feet per hour at a gas/air mixture which was approximately 12% excess gas. The resultant glass-sphere product had an average density of 1.10 grams per cubic centimeter at a yield of 43% by weight hollow glass spheres. This product was comprised of particles whose sizes broke down as follows: 90P=13.7 microns; 10P=4.0 microns; and 50P=8.8 microns. Accordingly, its GP was 1.10.

Hydrostatic pressure testing of this product produced only a 13% volume loss at 10,000 psi and only a 30% volume loss at 20,000 psi.

The chemical durability and resistance to leaching of this product was determined by subjecting a sample to boiling deionized water under reflux for one hour and then testing the water for pH, conductivity, and content of total alkali, calcium, boron, and silica. For comparison, the same test was conducted on commercial soda-lime glass and a borosilicate glass. The results are presented in the following table:

|  | pH | Conductivity ($\mu$mho/cm) | Total Alkali (mg/cc) | Calcium (mg/cc) | Boron (mg/cc) | Silica (mg/cc) |
| --- | --- | --- | --- | --- | --- | --- |
| Sample | 8.3 | 52 | 8.3 | 7.1 | 7.0 | 0.4 |
| Soda-Lime Glass | 9.4 | 101 | 25.7 | 18.1 | trace | 5.4 |
| Boro- | 8.5 | 45 | 3.6 | 20.4 | 18.7 | 1.1 |

| | pH | Conductivity (μmho/cm) | Total Alkali (mg/cc) | Calcium (mg/cc) | Boron (mg/cc) | Silica (mg/cc) |
|---|---|---|---|---|---|---|
| silicate Glass | | | | | | |

These results demonstrate that the overall chemical resistance and durability of the hollow glass-sphere product exceeds that of these commercial glasses.

Thus, the present invention meets its objectives in providing a new chemical composition for hollow glass spheres. This composition produces hollow spheres having high strength, yield and chemical durability. The average densities of these spheres can range from 0.10 grams per cubic centimeter to 2.0 grams per cubic centimeter. The strength of these hollow glass spheres is further enhanced through an optimum selection of particle sizes.

The terms and expressions which have been employed herein are used as terms of description and not of limitation, and there is no intention in the use of such terms and expressions to exclude any equivalents of the features described or of portions thereof, it being recognized that various modifications are possible within the scope of the invention.

We claim:

1. Durable high-strength hollow glass spheres made by heating solid glass particles, said spheres having an average density or from approximately 0.10 grams/cc to aproximately 2.0 grams/cc and consisting essentially of the following ingredients in the following amounts stated as weight percentages:

| | |
|---|---|
| $SiO_2$ | 50–57 |
| $R_2O$ | 2–15 |
| $B_2O_3$ | 0–20 |
| S | .05–1.5 |
| RO | 2–25 |
| $RO_2$ other than $SiO_2$ | 0–5 |
| $R_2O_3$ other than $B_2O_3$ | 0–10 |
| $R_2O_5$ | 0–5 |
| F | 0–5 | wherein R represents a metal or other element, having a valence of 1, 2, 3, 4, or 5 as dictated by the formulae set forth above, which combines with oxygen.

2. Hollow glass spheres as in claim 1 wherein $R_2O$ in $Na_2O$, $K_2O$ or $Li_2O$.

3. Hollow glass spheres as in claim 1 wherein $R_2O$ is $Na_2O$, $K_2O$ and $Li_2O$ which are present in weight percentages of 2.5 to 12.8, 3.8 to 10.0 and 1.0 to 3.0, respectively.

4. Hollow glass spheres as in claim 1 wherein $R_2O$ is $Na_2O$, $K_2O$ and $Li_2O$ which are present in the amounts of approximately one part by weight $Li_2O$, to two parts by weight $Na_2O$, to three parts by weight $K_2O$, such that $Li_2O$, $Na_2O$ and $K_2O$ are included in the glass in a substantially molar balance.

5. Hollow glass spheres as in claim 1 wherein $B_2O_3$ is present in a weight percentage of 6 to 15.

6. Hollow glass spheres as in claim 1 wherein RO is CaO or ZnO.

7. Hollow glass spheres as in claim 1 where RO is CaO and ZrO which are present in weight percentages of 5 to 20 and 1.5 to 4.0, respectively.

8. Hollow glass spheres as in claim 1 wherein $RO_2$ other than $SiO_2$ is substantially absent.

9. Hollow glass spheres as in claim 1 wherein $R_2O_3$ other than $B_2O_3$ is $Al_2O_3$.

10. Hollow glass spheres as in claim 9 wherein $Al_2O_3$ is present in a weight percentage of 2 to 7.

11. Hollow glass spheres as in claim 1 wherein $R_2O_5$ is $P_2O_5$ and is present in a weight percentage of 0.5 to 4.0.

12. Hollow glass spheres as in claim 1 wherein F is present in a weight percentage of 1.5 to 2.5.

13. Hollow glass spheres as in claim 1 wherein $B_2O_3$ is present in a weight percentage of 11.74 to 20.

14. A product of durable high-strength hollow glass spheres and solid glass spheres made by heating solid glass particles, said product having an average density of approximately 0.10 grams/cc to approximately 2.0 grams/cc and consisting essentially of the following ingredients in the following amounts stated as weight percentages:

| | |
|---|---|
| $SiO_2$ | 50–57 |
| $R_2O$ | 2–15 |
| $B_2O_3$ | 0–20 |
| S | .05–1.5 |
| RO | 2–25 |
| $RO_2$ other than $SiO_2$ | 0–5 |
| $R_2O_3$ other than $B_2O_3$ | 0–10 |
| $R_2O_5$ | 0–5 |
| F | 0–5 | wherein R represents a metal or other element, having a valence of 1, 2, 3, 4, or 5 as dictated by the formulae set forth above, which combines with oxygen.

15. A product of glass spheres as in claim 14 wherein $R_2O$ is $Na_2O$, $K_2O$ or $Li_2O$.

16. A product of glass spheres as in claim 14 wherein $R_2O$ is $Na_2O$, $K_2O$ and $Li_2O$ which are present in weight percentages of 2.5 to 12.8, 3.8 to 10.0 and 1.0 to 3.0, respectively.

17. A product of glass spheres as in claim 14 wherein $R_2O$ is $Na_2O$, $K_2O$ and $Li_2O$ which are present in the amounts of approximately one part by weight $Li_2O$, to two parts by weight $Na_2O$, to three parts by weight $K_2O$, such that $Li_2O$, $Na_2O$ and $K_2O$ are included in the glass in a substantially molar balance.

18. A product of glass spheres as in claim 14 wherein $B_2O_3$ is present in a weight percentage of 6 to 15.

19. A product of glass spheres as in claim 14 wherein RO is CaO or ZnO.

20. A product of glass spheres as in claim 14 wherein RO is CaO and ZnO which are present in weight percentages of 5 to 20 and 1.5 to 4.0, respectively.

21. A product of glass spheres as in claim 14 wherein $RO_2$ other than $SiO_2$ is substantially absent.

22. A product of glass spheres as in claim 14 wherein $R_2O_3$ other than $B_2O_3$ is $Al_2O_3$.

23. A product of glass spheres as in claim 22 wherein $Al_2O_3$ is present in a weight percentage of 2 to 7.

24. A product of glass spheres as in claim 14 wherein $R_2O_5$ is $P_2O_5$ and is present in a weight percentage of 0.5 to 4.0.

25. A product of glass spheres as in claim 14 wherein F is present in a weight percentage of 1.5 to 2.5.

26. A product of glass spheres as in claim 14 wherein $B_2O_3$ is present in a weight percentage of 11.74 to 20.

27. Durable high-strength hollow glass spheres made by heating solid glass particles, said spheres consisting essentially of the following ingredients in the following amounts stated as weight percentages:

|       |          |
| ----- | -------- |
| $SiO_2$ | 50–57 |
| $Na_2O$ | 2.5–12.8 |
| $K_2O$ | 3.8–10.0 |
| $Li_2O$ | 1.0–3.0 |
| $B_2O_3$ | 6–15 |
| S | .05–1.5 |
| CaO | 5–20 |
| ZnO | 1.5–4.0 |
| $Al_2O_3$ | 2–7 |
| $P_2O_5$ | .5–4.0 |
| F | 1.5–2.5 | wherein R represents a metal or other element, having a valence of 1, 2, 3, 4, or 5 as dictated by the formulae set forth above, which combines with oxygen.

28. Hollow glass spheres as in claim 27 wherein $Na_2O$, $K_2O$ and $Li_2O$ are present in the amounts of approximately one part by weight $Li_2O$, to two parts by weight $Na_2O$, to three parts by weight $K_2O$, such that $Li_2O$, $Na_2O$ and $K_2O$ are included in the glass in a substantially molar balance.

29. Hollow glass spheres as in claim 27 wherein $B_2O_3$ is present in a weight percentage of 11.74 to 15.

30. An article of manufacture comprising a polymeric compound and dispersed therein durable high-strength hollow glass spheres made by heating solid glass particles, said spheres having an average density of approximately 0.10 grams/cc to approximately 2.0 grams/cc and consisting essentially of the following ingredients in the following amounts stated as weight percentages:

|       |          |
| ----- | -------- |
| $SiO_2$ | 50–57 |
| $R_2O$ | 2–15 |
| $B_2O_3$ | 0–20 |
| S | .05–1.5 |
| RO | 2–25 |
| $RO_2$ other than $SiO_2$ | 0–5 |
| $R_2O_3$ other than $B_2O_3$ | 0–10 |
| $R_2O_5$ | 0–5 |
| F | 0–5 | wherein R represents a metal or other element, having a valence of 1, 2, 3, 4, or 5 as dictated by the formulae set forth above, which combines with oxygen.

31. An article of manufacture as in claim 30 comprising a polymeric compound and dispersed therein durable high-strength hollow glass spheres wherein $B_2O_3$ is present in said spheres in a weight percentage of 11.74 to 20.

32. An article of manufacture comprising a polymeric compound and dispersed therein the product of durable high-strength hollow glass spheres and solid glass spheres made by heating solid glass particles, said product having an average density of approximately 0.10 grams/cc to approximately 2.0 grams/cc and consisting essentially of the following ingredients in the following amounts stated as weight percentages:

|       |          |
| ----- | -------- |
| $SiO_2$ | 50–57 |
| $R_2O$ | 2–15 |
| $B_2O_3$ | 0–20 |
| S | .05–1.5 |
| RO | 2–25 |
| $RO_2$ other than $SiO_2$ | 0–5 |
| $R_2O_3$ other than $B_2O_3$ | 0–10 |
| $R_2O_5$ | 0–5 | wherein R represents a metal or other element, having a valence of 1, 2, 3, 4, or 5 as dictated by the formulae set forth above, which combines with oxygen.

33. An article of manufacture as in claim 32 comprising a polymeric compound and dispersed therein the product of durable high-strength hollow glass spheres and solid glass spheres wherein $B_2O_3$ is present in said product in a weight percentage of 11.74 to 20.

34. An article of manufacture comprising a polymeric compound and durable high-strength hollow glass spheres made by heating solid glass particles, said spheres consisting essentially of the following ingredients in the following amounts stated as weight percentages:

|       |          |
| ----- | -------- |
| $SiO_2$ | 50–57 |
| $Na_2O$ | 2.5–12.8 |
| $K_2O$ | 3.8–10.0 |
| $Li_2O$ | 1.0–3.0 |
| $B_2O_3$ | 6–15 |
| S | .05–1.5 |
| CaO | 5–20 |
| ZnO | 1.5–4.0 |
| $Al_2O_3$ | 2–7 |
| $P_2O_5$ | .5–4.0 |
| F | 1.5–2.5. |

35. An article of manufacture as in claim 34 comprising a polymeric compound and durable high-strength hollow glass spheres wherein $B_2O_3$ is present in said spheres in a weight percentage of 11.74 to 15.

* * * * *